US008782185B2

United States Patent
Koenen et al.

(10) Patent No.: US 8,782,185 B2
(45) Date of Patent: Jul. 15, 2014

(54) NETWORK BOOTING A MACHINE COUPLED TO THE NETWORK BY A LINK AGGREGATION GROUP

(75) Inventors: David J. Koenen, Cypress, TX (US); Michael Lee Witkowski, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 193 days.

(21) Appl. No.: 13/561,518

(22) Filed: Jul. 30, 2012

(65) Prior Publication Data
US 2014/0032889 A1    Jan. 30, 2014

(51) Int. Cl.
*G06F 15/177*    (2006.01)

(52) U.S. Cl.
USPC ........... 709/222; 709/213; 709/223; 709/203; 709/201; 709/220; 370/392; 370/396; 370/401; 370/389; 713/2; 714/43

(58) Field of Classification Search
CPC .... G06F 15/177; H04L 45/245; H04L 47/125
USPC .......... 709/222, 213, 223, 203, 201, 220, 204
See application file for complete search history.

(56) References Cited

U.S. PATENT DOCUMENTS

| | | |
|---|---|---|
| 6,598,159 B1 | 7/2003 | McAlister et al. |
| 6,748,525 B1 | 6/2004 | Hubacher et al. |
| 7,308,612 B1 * | 12/2007 | Bishara ........................ 714/43 |
| 7,822,594 B2 | 10/2010 | Haviv et al. |
| 7,930,533 B1 | 4/2011 | Guo et al. |
| 8,654,680 B2 * | 2/2014 | Subramanian et al. ....... 370/255 |
| 8,665,879 B2 * | 3/2014 | Matthews et al. ........ 370/395.32 |
| 2012/0207154 A1 * | 8/2012 | Pham et al. .................. 370/389 |
| 2012/0320914 A1 * | 12/2012 | Thyni et al. .................. 370/389 |

OTHER PUBLICATIONS http://communities.vmware.com/thread/317069, "PXE Boot with Link Aggregation".

* cited by examiner

*Primary Examiner* — Jude Jean Gilles (57) ABSTRACT

A technique includes network booting a physical machine coupled to a network by a link aggregation group. The technique includes selectively disabling ports of the physical machine associated with the link aggregation group in connection with the network booting until a driver of an operating system to group the ports together is installed on the physical machine.

20 Claims, 6 Drawing Sheets

NETWORK BOOTING A MACHINE COUPLED TO THE NETWORK BY A LINK AGGREGATION GROUP

BACKGROUND

Link aggregation may be employed for purposes of increasing the communication bandwidth between network devices. With link aggregation, multiple physical links (network cables, for example) between the network devices form a single logical link, or link aggregation group (LAG), which has a larger available bandwidth than any of the individual physical links. Moreover, link aggregation provides for failover, in that should one of the physical links of the LAG fail, communications continue using the remaining physical links.

A LAG may be used for communications between a server and a network switch, between network switches, between a network switch and a router, and so forth. A computer's operating system may include teaming or bonding drivers that bundle the ports associated with the LAG together for purposes of presenting the bundled ports as a single logical port to the computers applications and network stack.

DETAILED DESCRIPTION

Figure 1:
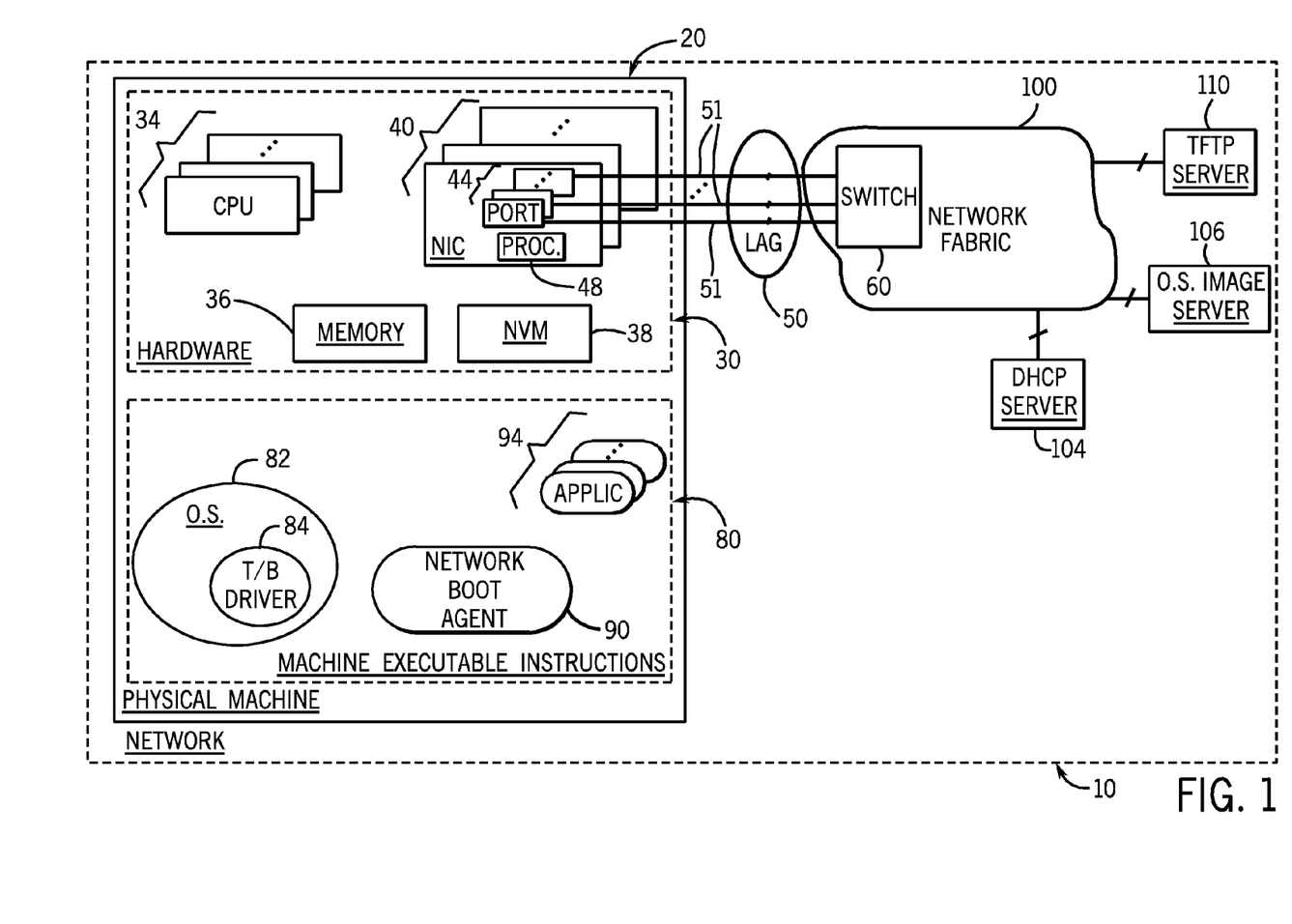
FIG. 1 is a schematic diagram of a network in which a link aggregation group (LAG) couples a physical machine to the network according to an example implementation.

Referring to FIG. 1, a network 10 includes a physical machine 20 (a server, a client, a desktop computer, a portable computer, a smart cellular telephone, a tablet computer and so forth), which boots up within the network 10 using a network boot agent 90. In this manner, in accordance with implementations, the network boot agent 90 undergoes a series of actions that result in an operating system (OS) image being retrieved from an OS image server 106 and installed on the physical machine 20. Therefore, the boot up of the physical machine 20 is independent of any local data storage devices of the physical machine 20 and does not rely on a pre-existing operation system image installation on the machine 20.

As a simple example, the network boot agent 90 may be a Preboot Execution Environment (PXE) agent that operates in a PXE environment, although other network boot agents, such as an internet Small Computer System Interface (iSCSI) boot agent, or a Fibre Channel over Ethernet (FCoE) boot agent may be used, in accordance with further implementations. Assuming for purposes of example that the network boot agent 90 is a PXE agent, the agent 90 may generally operate to network boot the physical machine 20 as follows. First, the network boot agent 90, from one of the network interface cards (NICs) 40 of the physical machine 20, communicates over network fabric 100 (Internet-based fabric, local area network (LAN) connections, routers, switches (including a switch 60 discussed herein, and so forth with a dynamic host configuration protocol (DHCP) server 104 to acquire an Internet Protocol (IP) address for the physical machine 20.

Next, in accordance with some implementations, the network boot agent 90 may communicate with a PXE redirection service (such as a service provided by a proxy DHCP server (not shown), for example) to locate a Trivial File Transfer Protocol (TFTP) server, which is a boot server that provides the file path of an operating system bootstrap program, or boot loader. The network boot agent 90 then downloads the boot loader program, which, when executed on the physical machine 20, causes the physical machine 20 to download an operating system image from the OS image server 106. The physical machine 20 then boots up from the downloaded operating system image.

Techniques and systems are described herein to address challenges that may otherwise arise during the above-described network boot-up due to the physical machine 20 being coupled to the other devices of the network 10 through links 51 that are aggregated, or grouped, together to form a link aggregation group (LAG) 50. In this manner, as further described herein, after being installed, a teaming/bonding driver 84 of an operating system 82 couples two or more NIC ports 44 on the physical machine 20 to the LAG 50 and to the network switch 60, which is part of the network fabric 100).

In general, the LAG 50 is formed from multiple physical links 51, where each physical link 51 includes, for example, a NIC port 44 of a NIC 40 in physical machine 20, a network cable and a physical network port of the switch 60. After the operating system 82 of the physical machine 20 is installed, one or multiple teaming/bonding driver(s) 84 of the physical machine's operating system 82 bundles the network ports associated with the LAG 50 together into one logical port for use by the machine's applications and network stack. However, this bundling is not available in the pre-operating system environment and as such, not available for the network boot agent 90. Moreover, all of the server NIC ports 44 may be initially enabled by default, and as such, the NIC ports 44 may show, by default, enabled links 51 when connected to a switch (such as the switch 60).

The network boot agent 90 may, in general, be constructed to drive and monitor a single physical NIC port 44 for purposes of network booting the physical machine 20. However, because multiple network ports (via the LAG 50) may be used to couple the physical machine 20 to the network 10, without the measures that are disclosed herein, frames of data (frames pertaining to IP addresses, the operating system image, the boot loader, and so forth) may potentially be lost, thereby resulting in failure of the network boot-up of the physical machine 20. Thus, a primary challenge in getting the network boot agent 90 to work on two or more server links connected to a switch LAG is that the switch 60 may choose to communicate on a different port than the port on which the network boot agent 90 is active.

Even if the network boot agent 90 is fortunate to receive a response from the DHCP server 104 over the active PXE NIC port 44, the network boot agent 90 may also need information received from other entities (such as the boot loader from the TFTP server 110, the operating system image from the operating system image server 106, and so forth), which may be on different servers with different IP addresses. Therefore, if load balancing is statically configured for the switch's LAG 50, the next server traffic may go to an unmonitored server port. More specifically, even if all of this information were on the same server with the same IP address, the network switch 60 may use a load balancing hash algorithm that is based on a user datagram protocol (UDP) port number or based on a transfer control protocol (TCP) port number and therefore, direct replies to a port of the physical machine 20, which the network boot agent 90 will not receive. In this manner, the network switch 60 may act on a hash of the destination media access control (MAC) and IP addresses for outbound traffic address to load balance traffic among the ports but may also use the TCP/UDP port numbers as well.

As disclosed herein, for purposes of preventing frames from being lost during the boot-up procedure due to unmonitored NIC ports 44 of the physical machine 20, the network boot agent 90 selectively regulates the enabling and disabling of these NIC ports 44.

Figure 2:
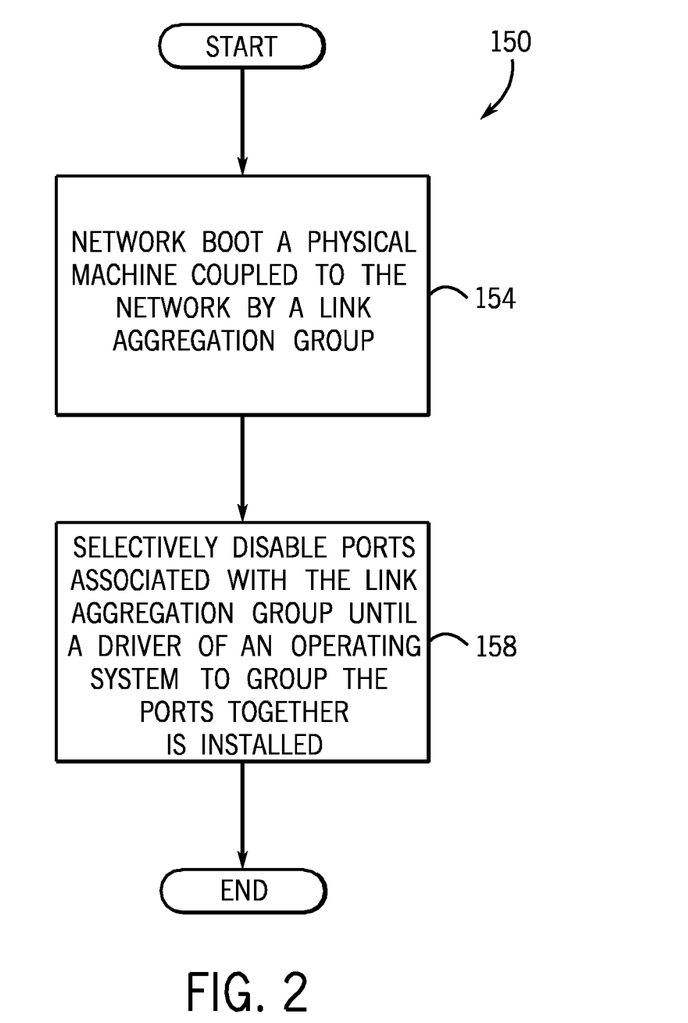
FIG. 2 is a flow diagram depicting a technique used to network boot the physical machine of FIG. 1 according to an example implementation.

As a more specific example, in accordance with example implementations, a technique 150 that is generally depicted in FIG. 2 may be employed for purposes of network booting a physical machine. Referring to FIG. 2 in conjunction with FIG. 1, in accordance with example implementations, the technique 150 includes network booting (block 154) a physical machine coupled to a network by a LAG. Pursuant to the technique 150, in connection with the network bootup, network ports associated with the LAG are selectively disabled (block 158) for purposes of regulating which ports receive frames until a teaming/bonding driver of the operating system is installed to group the ports together.

Figure 2A:
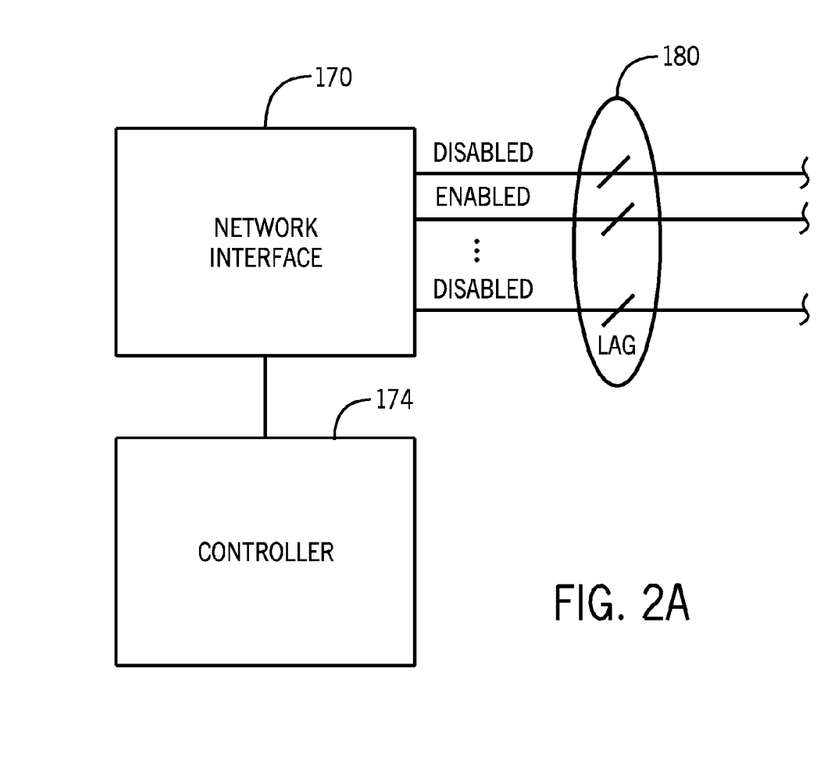
FIG. 2A is a schematic diagram illustrating a network boot according to an example implementation.

Thus, referring to FIG. 2A, in accordance with example implementations, a controller 174 may perform a network bootup of a machine. In this network bootup, the controller 174 selectively disables ports of a multi-port network interface 170 that is coupled to a network by a link aggregation group 180 until a driver of an operating system is installed on the machine.

Referring back to FIG. 1, when the network boot agent 90 disables a given physical NIC port 44, the network switch 60 uses its load balancing failover (LBFO) capability to mark the associated physical link as being disabled and thereafter (until the link/port is re-enabled) remove the link from the LAG. Therefore, data is not communicated to a disabled physical port but is instead redistributed to the remaining, enabled port(s). Thus, for example, the network boot agent 90 controls which port of the physical machine 20 receives the frames of data and which ports of the physical machine 20 do not receive frames of data during the boot-up, as further described below.

Referring back to FIG. 1, in accordance with example implementations, the physical machine 20 is an actual machine made up of hardware 30 and machine executable instructions 80. In this regard, the hardware 30 of the physical machine 20 may include, for example, central processing units (CPUs) 34 to execute machine executable instructions 80 associated with (as examples) the network boot agent 90, the downloaded boot loader, the operating system, applications, the teaming/bonding drivers, and so forth.

The machine executable instructions 80 may be at least temporarily stored in storage, such as the storage provided by a volatile system memory 36 (dynamic random access memory (DRAM), for example) and a non-volatile memory (NVM) 38. In this regard, the NVM 38 may store, for example, machine executable instructions associated with "firmware," such as the network boot agent 90, for example. As a more specific example, in accordance with some implementations, the NVM 38 includes a Peripheral Component Interconnect (PCI) option read only memory (ROM), which is discoverable by the basic input/output operating system (BIOS) of the physical machine 20. In this regard, the network boot agent 90 is executed as part of a boot order sequence or preference of the physical machine 20.

In general, the memories 36 and 38 are non-transitory memories that may be formed from one or more of the following (as examples): semiconductor storage devices, magnetic storage memory, optical storage devices, phase change memory devices, removable media storage, and so forth.

As also depicted in FIG. 1, in accordance with example implementations, the hardware 30 of the physical machine 20 may include network interface cards (NICs) 40. As an example, a given NIC 40 may be a multiple port device containing a plurality of physical network ports 44 for the physical machine 20 so that a set of ports 44 of the NIC 40 may be associated with (i.e., are used to form) the LAG 50. In further implementations, network ports 44 of multiple NICs 40 may be associated with a single LAG 50. Thus, many variations are contemplated and are within the scope of the appended claims.

As depicted in FIG. 1, a given NIC 40 generally includes one or multiple embedded processors 48. These processor(s) 48, in turn, may serve as a bootup controller to execute instructions to monitor the network boot agent 90 and disable and enable the NIC ports 44, in accordance with some implementations. However, in accordance with further implementations, the instructions to form the bootup controller and thus, form the network boot agent 90 may be executed by one or multiple CPUs 34. Thus, many variations are contemplated and are within the scope of the appended claims.

It is noted that the hardware 30 may contain various other devices that are not depicted in FIG. 1, such as displays, magnetic storage devices, optical storage devices, input devices (a mouse and a keyboard, for example), memory controllers, bus bridges, graphics processors, and so forth. Thus, many variations are contemplated, which are within the scope of the appended claims.

The operating system 82 and network boot agent 90 are examples of entities formed from machine executable instructions 80 of the physical machine 20. It is noted that the physical machine 20 may include various different and/or other agents or modules formed by the machine executable instructions 80, such as applications 94, drivers, application programming interfaces (APIs) and so forth.

The network boot agent 90, in accordance with example implementations, is constructed to access (read from and write to, for example) hardware registers of the NIC 40 or an embedded processor 48 of the NIC 40 for purposes of selectively enabling and disabling the ports 44 and thus, selectively enabling and disabling physical ports associated with the LAG 50. In accordance with some implementations, the NIC ports 44 associated with the LAG 50 are part of the same multiport NIC 40. In further implementations, the NIC ports 44 associated with the LAG 50 may be contained in multiple NICs 40 (where all NICs are made by the same hardware vendor, for example). Thus, many variations are contemplated, which are within the scope of the appended claims.

As described above, pursuant to the technique 150, the network boot agent 90 selectively disables unused ports associated with the LAG 50 during the network bootup process until the operating system has loaded the teaming/bonding driver(s) 84. One way to accomplish this is depicted by an example technique 200 of FIG. 3.

Figure 3:
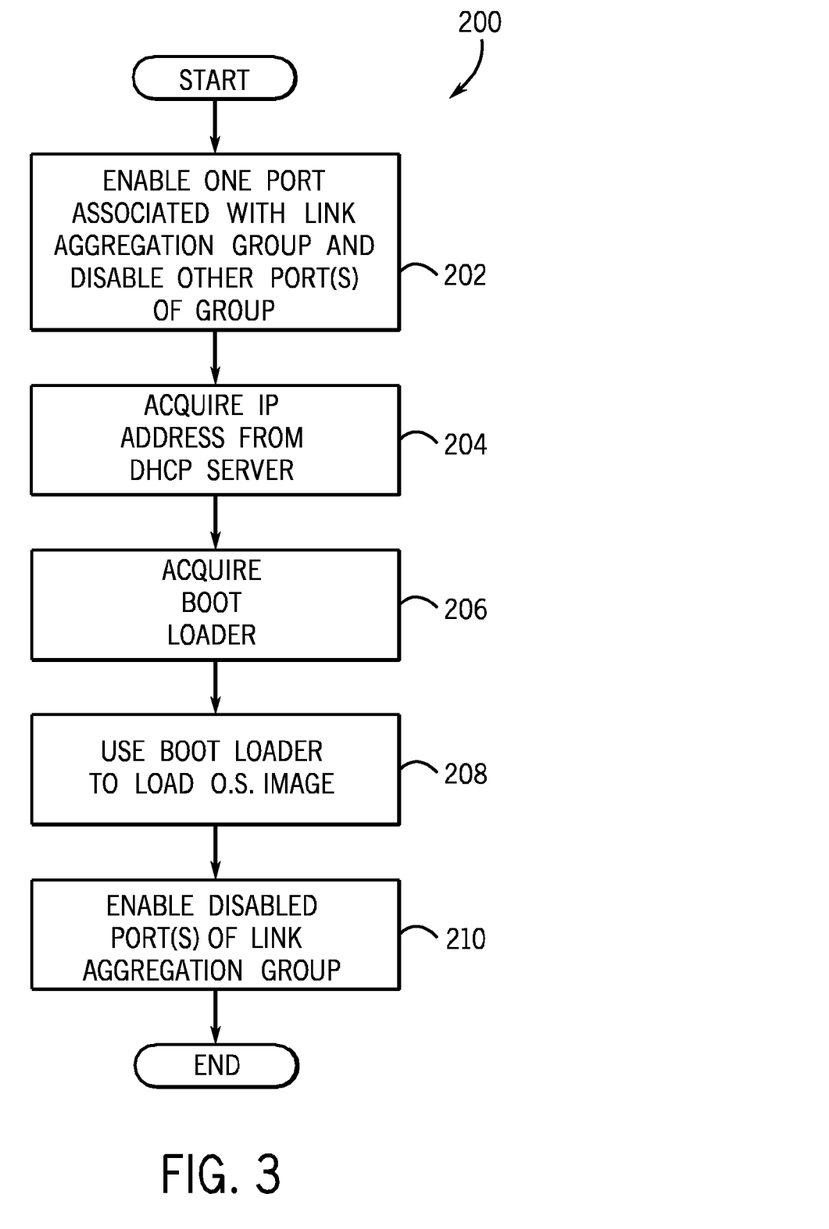
FIGS. 3, 4 and 5 are flow diagrams depicting different techniques used by a network boot agent of the physical machine to selectively enable and disable network ports of the physical machine associated with the LAG in connection with the network bootup of the machine according to example implementations.

Referring to FIG. 3 in conjunction with FIG. 1, pursuant to the technique 200, the network boot agent 90 enables (block 202) one port associated with the LAG, disables the other port(s) of the LAG then acquires the IP address from the DHCP server, pursuant to block 204, using the enabled port. Using the enabled port, the network boot agent 90 acquires (block 206) the boot loader from the network and uses (block 208) the boot loader to load the operating system image onto the physical machine. After the boot loader executes to load the operating system image, and thus, the teaming/bonding driver(s) 84 become active, the network boot agent 90 enables (block 210) the disabled port(s) of the LAG.

Figure 4:
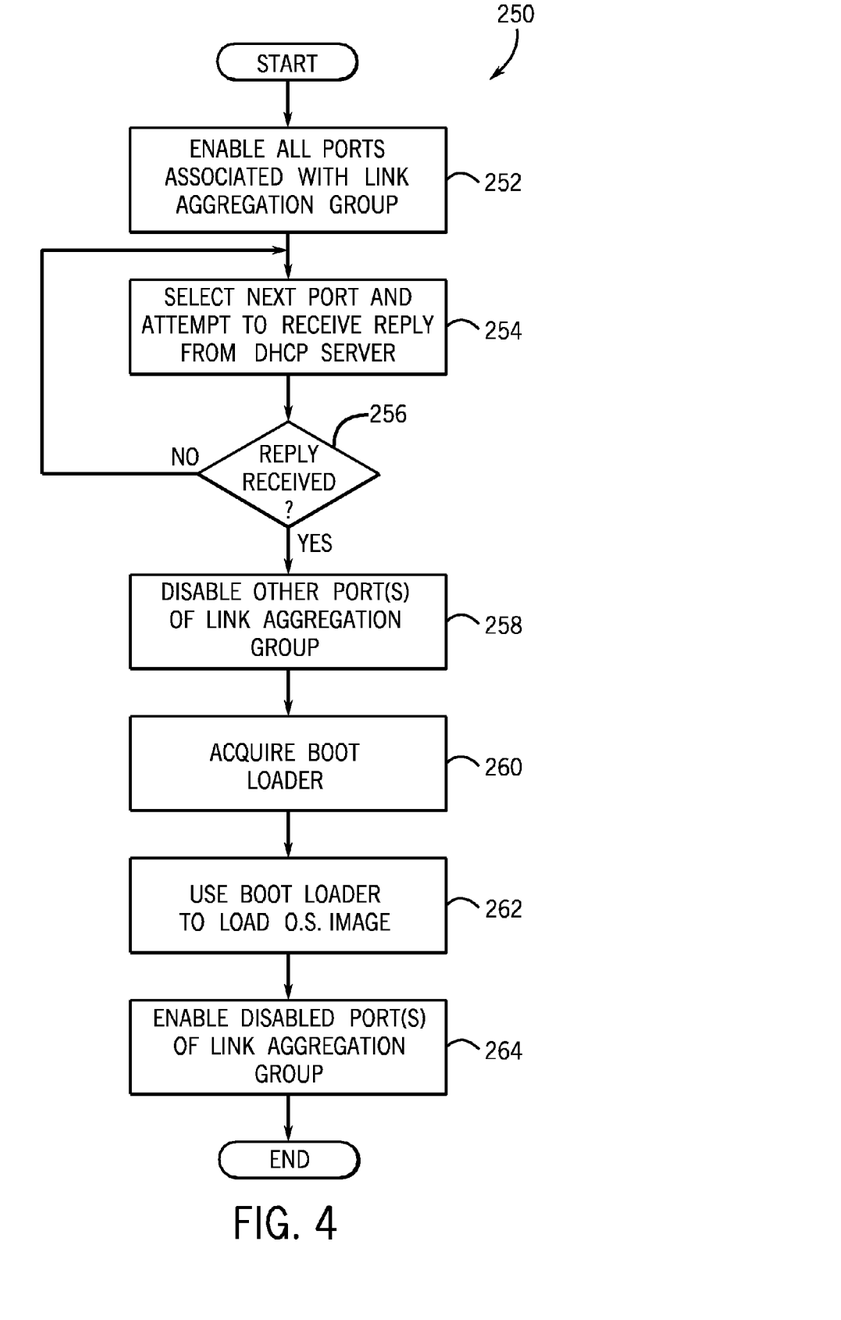

Alternatively, the network boot agent 90 may use a technique 250 that is depicted in FIG. 4. Referring to FIG. 4 in conjunction with FIG. 1, pursuant to the technique 250, the network boot agent initially enables (block 252) all of the ports associated with the LAG. Next, the network boot agent begins an iterative process to identify a port that receives a reply from the DHCP server. In this regard, pursuant to the technique 250, the network boot agent selects (block 254) the next port of the group of ports and attempts to receive a reply from the DHCP server. If a reply is not received (decision block 256), then the network boot agent 90 selects the next port, pursuant to block 254. If a reply is received over a given port, however, the network boot agent disables (block 258) the other port(s). Using the enabled port, the network boot agent acquires (block 260) the boot loader from the network and uses (block 262) the boot loader to load the operating system image. After the operating system image is loaded, the network boot agent enables (block 264) the disabled port(s).

Figure 5:
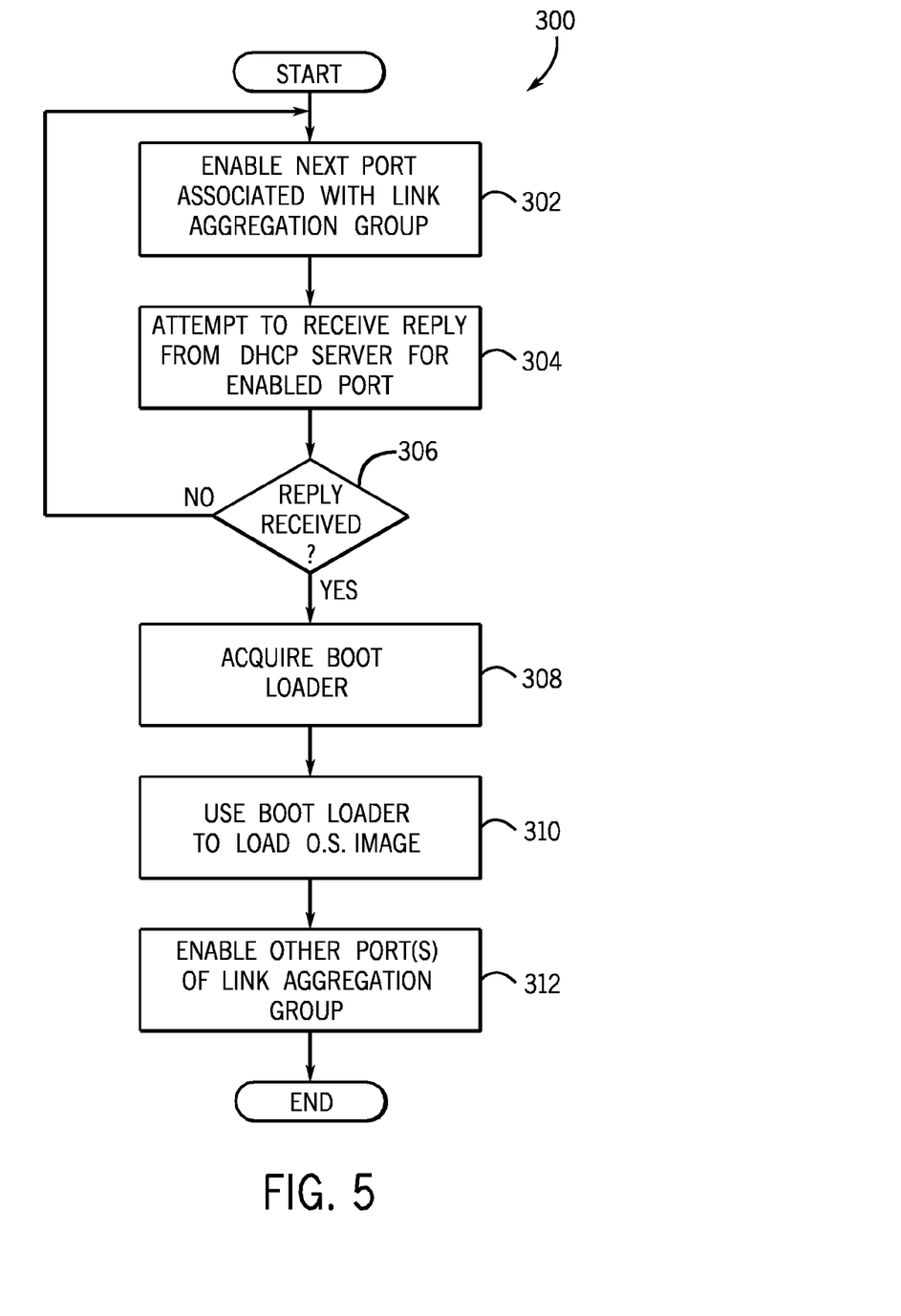

Alternatively, in other implementations, the network boot agent 90 uses a technique 300 that is depicted in FIG. 5. Referring to FIG. 5 in conjunction with FIG. 1, pursuant to the technique 300, the network boot agent selectively enables one port at a time for purposes of determining which port receives a reply from the DHCP server. In this regard, pursuant to the technique 300, the network boot agent enables (block 302) the next port associated with the LAG and attempts (block 304) to receive a reply from the DHCP server from the enabled port. If the network boot agent determines (decision block 306) that a reply is not successfully received, then the network boot agent 90 enables the next port and control returns to block 302. Otherwise, if a reply was successfully received (decision block 306), then the currently enabled port is used to acquire (block 308) the boot loader from the network so that the boot loader may be used (block 310) to load the operating system image. After the operating system image is loaded, the network boot agent enables (block 312) the other port(s).

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
   network booting a physical machine coupled to a network by a link aggregation group; and
   selectively disabling ports of the physical machine associated with the link aggregation group in connection with the network booting until a driver of an operating system to group the ports together is installed on the physical machine.

2. The method of claim 1, wherein selectively disabling the ports comprises:
   enabling one of the ports;
   disabling the remaining one or more ports; and
   using the enabled port to acquire an operating system image from the network and load the operating system image onto the physical machine.

3. The method of claim 2, wherein using the enabled port to load the operating system image comprises at least one of acquiring a boot loader from the network and a boot loader to load the operating system image.

4. The method of claim 1, wherein selectively disabling the one or more ports comprises:
   enabling all of the ports;
   selectively attempting to receive a reply from a dynamic host control protocol (DHCP) server using the ports; and
   based on the result of selectively attempting to receive the reply, selectively disabling the ports.

5. The method of claim 4, wherein selectively disabling the ports comprises enabling one of the ports and disabling the remaining one or more ports, the method further comprising using the enabled one port to load the operating system image onto the physical machine.

6. The method of claim 5, wherein using the enabled port to load the operating system image comprises at least one of acquiring a boot loader from the network and executing a boot loader to load the operating system image.

7. The method of claim 1, wherein selectively disabling the ports comprises:
   enabling one of the ports;
   disabling the other one or more ports;
   attempting to receive a reply from a dynamic host control protocol (DHCP) server using the enabled port;
   selectively repeating the enabling and disabling until a reply is received from the enabled port; and
   using the enabled port on which the reply is received to load the operating system image.

8. An article comprising a non-transitory storage medium to store instructions that when executed by a computer causes the computer to:
   network boot the computer, the computer being coupled to an aggregation group; and
   in connection with the network boot, selectively disable ports of the physical machine associated with the link aggregation group until a driver of an operating system to group the ports together is installed on the computer.

9. The article of claim 8, the storage medium containing instructions that when executed by the computer cause the computer to:
   enable one of the ports;
   disable the remaining one or more ports; and
   use the enabled port to load an operating system image onto the computer.

10. The article of claim 9, the storage medium containing instructions that when executed by the computer cause the computer to perform at least one of acquiring a boot loader from the network and executing a boot loader to load the operating system image.

11. The article of claim 8, the storage medium containing instructions that when executed by the computer cause the computer to:
    enable all of the ports;
    selectively attempt to receive a reply from a dynamic host control protocol (DHCP) server using the ports; and
    based on the result of selectively attempting to receive the reply, selectively disable the ports.

12. The article of claim 11, the storage medium containing instructions that when executed by the computer cause the computer to enable one of the ports, disable the remaining one or more ports, and use the enabled port to load the operating system image.

13. The article of claim 12, wherein the computer comprises one of a server, a client, a desktop computer, a portable computer, a smartphone and a tablet computer.

14. An apparatus comprising:
a multi-port network interface coupled to a network by a link aggregation group; and
a controller to perform a network bootup of a machine, the controller to selectively disable ports of the multi-port interface associated with the link aggregations group until a driver of an operating system is installed on the machine.

15. The apparatus of claim 14, wherein the controller:
enable one of the ports;
disable the remaining one or more ports; and
use the enabled port to acquire an operating system image from the network and load the operating system image onto the machine.

16. The apparatus of claim 15, wherein the controller acquires a boot loader from the network and execute a boot loader to load an operating system image.

17. The apparatus of claim 14, wherein the controller:
enable all of the ports;
selectively attempt to receive a reply from a dynamic host control protocol (DHCP) server from the ports; and based on the results of selectively attempting to receive the reply, selectively disable the ports.

18. The apparatus of claim 17, wherein the controller enables one of the ports, disable the remaining one or more ports, and use the enabled port to load an operating system image.

19. The apparatus of claim 18, wherein the controller performs at least one of acquiring a boot loader from the network and executing a boot loader to load the operating system image.

20. The apparatus of claim 14, wherein the controller:
enable one of the ports;
disable the other one or more ports;
attempt to receive a reply from a dynamic host control protocol (DHCP) server using the enabled port;
selectively repeat the enabling and disabling until a reply is received from the enabled port; and
use the enabled port on which the reply is received to load the operating system image.

* * * * *